(12) United States Patent
Shim

(10) Patent No.: US 8,854,652 B2
(45) Date of Patent: Oct. 7, 2014

(54) HOST DEVICE AND PRINTING CONTROL METHOD THEREOF

(75) Inventor: Wook-jin Shim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1573 days.

(21) Appl. No.: 11/830,894

(22) Filed: Jul. 31, 2007

(65) Prior Publication Data

US 2008/0180730 A1    Jul. 31, 2008

(30) Foreign Application Priority Data

Jan. 26, 2007  (KR) .................. 10-2007-0008286

(51) Int. Cl.
*G06F 3/12*    (2006.01)

(52) U.S. Cl.
CPC ............ *G06F 3/1205* (2013.01); *G06F 3/1247* (2013.01); *G06F 3/1254* (2013.01)
USPC .......... 358/1.15; 358/1.13; 347/49; 715/752; 348/207.2

(58) Field of Classification Search
USPC .......... 348/207.2, 14.12; 358/1.13, 402, 442, 358/296, 1.15, 400, 405, 1.14; 710/60; 709/224
See application file for complete search history.

(56) References Cited

U.S. PATENT DOCUMENTS

| | | | | |
|---|---|---|---|---|
| 4,939,767 A * | 7/1990 | Saito et al. | ............... | 348/14.12 |
| 5,438,427 A * | 8/1995 | Yoshida | ............... | 358/405 |
| 5,604,597 A * | 2/1997 | Imai | ............... | 358/296 |
| 6,112,239 A * | 8/2000 | Kenner et al. | ............... | 709/224 |
| 6,226,097 B1 * | 5/2001 | Kimura | ............... | 358/1.14 |
| 6,693,720 B1 * | 2/2004 | Livingston | ............... | 358/1.15 |
| 6,728,920 B1 * | 4/2004 | Ebersman | ............... | 714/752 |
| 6,876,461 B2 * | 4/2005 | Usami | ............... | 358/1.15 |
| 6,882,450 B1 * | 4/2005 | Baba | ............... | 358/442 |
| 6,894,795 B1 * | 5/2005 | Simpson et al. | ............... | 358/1.15 |
| 6,918,646 B2 * | 7/2005 | Kanda et al. | ............... | 347/19 |
| 7,190,469 B1 * | 3/2007 | Gomi | ............... | 358/1.14 |
| 7,221,465 B1 * | 5/2007 | Shimada | ............... | 358/1.14 |
| 7,389,448 B2 | 6/2008 | Sakai | | |
| 7,406,270 B2 * | 7/2008 | Miyazawa et al. | ............... | 399/8 |

(Continued)

FOREIGN PATENT DOCUMENTS

| | | |
|---|---|---|
| CN | 1777865 | 5/2006 |
| JP | 11-119952 | 4/1999 |

(Continued)

OTHER PUBLICATIONS

European Search Report issued Jul. 6, 2010 in EP Application No. 07121039.7.

(Continued)

*Primary Examiner* — Ashish K Thomas
(74) *Attorney, Agent, or Firm* — Stanzione & Kim, LLP

(57) ABSTRACT

A host device and a printing control method of the host device. The host device includes a print data generation unit to generate print data for each page of a document to be printed, a transmission unit to transmit the generated print data to an image forming device, a menu generation unit to generate a print option setting menu if an interrupt occurs while transmitting the print data through the transmission unit, and a controller to control the print data generation unit to convert the print data after occurrence of the interrupt into print data to which the reset print option is applied.

21 Claims, 5 Drawing Sheets

(56) References Cited

U.S. PATENT DOCUMENTS

| | | | |
|---|---|---|---|
| 7,406,548 B2 * | 7/2008 | Owens et al. | 710/60 |
| 7,818,479 B2 * | 10/2010 | Takeuchi et al. | 710/59 |
| 7,852,508 B2 * | 12/2010 | Il | 358/1.18 |
| 2006/0158518 A1 * | 7/2006 | Sakai | 348/207.2 |
| 2006/0262335 A1 * | 11/2006 | Varga | 358/1.13 |
| 2008/0007791 A1 * | 1/2008 | Nagarajan et al. | 358/402 |
| 2008/0037055 A1 * | 2/2008 | Yun | 358/1.15 |

FOREIGN PATENT DOCUMENTS

| | | |
|---|---|---|
| JP | 2000-79742 | 3/2000 |
| JP | 2003-167705 | 6/2003 |
| KR | 10-238596 | 10/1999 |
| KR | 2004-11094 | 2/2004 |
| KR | 2005-49763 | 5/2005 |
| KR | 1020050067696 | 7/2005 |
| KR | 1020060009648 | 2/2006 |

OTHER PUBLICATIONS

Chinese Office Action issued Jan. 26, 2011 in CN Application No. 200710149211.1.

Korean Office Action Issued on Jan. 19, 2012 in KR Application No. 10-2007-0081906.

Korean Notice of Allowance Issued on Mar. 23, 2012 in KR Patent Application No. 10-2007-0081906.

* cited by examiner

FIG. 3

| FILE NAME | PAGE NO. | STATE | SIZE | PORT |
|---|---|---|---|---|
| PRESENTATION DATA | 3 | PRINTING | 394KB/780KB | SEC00f0a082 |
| | 4 | SPOOLING | 2.1MB | |
| | 5 | SPOOLING | 1.2MB | |
| | ⋮ | | | |
| | 9 | SPOOLING | 100KB/174KB | |

HOST DEVICE AND PRINTING CONTROL METHOD THEREOF

CROSS-REFERENCE TO RELATED APPLICATIONS

This application claims priority under 35 U.S.C. §119(a) from Korean Patent Application No. 10-2007-0008286, filed Jan. 26, 2007, the contents of which are incorporated herein by reference in its entirety.

BACKGROUND OF THE INVENTION

1. Field of the Invention

The present general inventive concept relates to a host device and a printing control method thereof. More particularly, the present general inventive concept relates to a host device and a printing control method thereof that can reset a print option for each page during a printing operation by generating print data for each page.

2. Description of the Related Art

Generally, computers and printers are kernel and indispensable devices for office automation. A printer is a device for printing print data corresponding to an input document to be printed on a recording medium, such as printing paper. In order for the printer to print the document prepared by a computer, it is required to install a printer driver to operate the printer in the computer.

The printer driver has a function of converting the document to be printed, which is prepared by an application program installed in the computer, into print data which can be interpreted by the printer, using a spooler. A user can change a variety of print options (e.g., printer selection, printing paper size, the number of copies, toner save mode, background setup, and so forth) through a user interface of the printer driver.

If a print option is changed by the user during the printing operation, the changed print option is reapplied and the printing operation is resumed from the first page of the printing document. In other words, whenever a print option is changed, the printing operation is resumed from the beginning, and this causes waste of printing papers and toner.

Also, whenever a print option is changed, the printing operation is repeated, and this causes a lengthening of time for the whole printing work.

SUMMARY OF THE INVENTION

The present general inventive concept provides a host device and a printing control method thereof that can reset a print option for each page during a printing operation by generating print data for each page.

Additional aspects and utilities of the present general inventive concept will be set forth in part in the description which follows and, in part, will be obvious from the description, or may be learned by practice of the general inventive concept.

The foregoing and other aspects and utilities of the present general inventive concept may be achieved by providing a host device including a print data generation unit to generate print data for each page of a document to be printed, a transmission unit to transmit the generated print data to an image forming device, a menu generation unit to generate a print option setting menu to reset a print option, if an interrupt occurs while transmitting the print data through the transmission unit, and a controller to control the print data generation unit to convert the print data after the occurrence of the interrupt into print data to which the reset print option is applied.

The host device may further include a buffer to temporarily store the print data to which the print option set through the print option setting menu is applied, and a display unit to display a waiting list of the print data temporarily stored in the buffer, wherein if the interrupt occurs during the printing operation of the document to be printed and at least one print data is selected from the waiting list, the controller may control the menu generation unit to generate the print option setting menu to reset the print option for the selected print data.

If the print option is reset through the print option setting menu, the controller may control the print data generation unit to convert the print data selected from the waiting list into the print data to which the reset print option is applied.

The menu generation unit may generate a submenu to select a print data generation speed of the print data generation unit and a transmission speed of the transmission unit, and the controller may control the print data generation unit and the transmission unit to generate and transmit the print data according to the print data generation speed and the transmission speed selected through the submenu.

According The foregoing and/or other aspects and utilities of the present general inventive concept may also be achieved by providing a printing control method of a host device, including generating print data for each page of a document to be printed, transmitting the generated print data to an image forming device, if an interrupt occurs while transmitting the print data through the transmission unit, stopping the print data transmission and displaying a print option setting menu, and if the print option is reset through the print option setting menu, converting the print data after the occurrence of the interrupt into print data to which the reset print option is applied and transmitting the print data.

The printing control method may further include temporarily storing the generated print data, and displaying a waiting list of the print data temporarily stored, wherein the transmitting of the generated print data may transmit the print data temporarily stored to the image forming device.

In the displaying of the print option setting menu if the interrupt occurs during the transmission of the print data and at least one print data is selected from the waiting list, the print option setting menu to reset the print option for the selected print data is displayed.

The converting of the print data may further include converting the selected print data into the print data to which the reset print option is applied, and transmitting the converted print data to the image forming device.

The method may further include displaying a submenu to select a print data generation speed and a transmission speed of the document to be printed, wherein the generating of the print data and the transmitting of the generated print data may include generating and transmitting the print data according to the print data generation speed and the transmission speed selected through the submenu.

The foregoing and/or other aspects and utilities of the present general inventive concept may also be achieved by providing a host device, including a print data generation unit to generate first print data with a first print option, a transmission unit to transmit the first generated print data to an image forming device, and a controller to control the print data generation unit to generate second print data with a second print option according to an interruption of the transmission of the first generated print data, wherein at least one of the first and second generated print data is generated on a page-by-page basis.

The controller may detect the interruption of the transmission of the first generated print data according to a signal from the transmission unit and the image forming device.

The first print data and the second print data can be the same, and the first print option and the second print option can be different.

The host device may further include a menu generating unit to display a menu, wherein the controller controls the menu generating unit to display a print option setting menu as the menu to set the second print option according to the interrupt.

The interrupt of the transmission of the first generated print data may include an incomplete transmission of the first generated print data with the first print option from the transmission unit to the image forming device.

The interrupt of the transmission of the first generated print data may include an incomplete print operation to print an image according to the first generated print data and the first print option in the image forming device.

The foregoing and/or other aspects and utilities of the present general inventive concept may also be achieved by providing a control method of a host device usable with an image forming device, the control method including generating a first print data according to a first print option, transmitting the first generated print data to an image forming device, detecting an interrupt of the transmitting of the first generated print data, and generating a second print data with a second print option if the interruption is detected, wherein at least one of the first and second generated print data is generated on a page-by-page basis.

The foregoing and/or other aspects and utilities of the present general inventive concept may also be achieved by providing a host device, including a print data generation unit to generate print data for each page of a document to be printed, a transmission unit to transmit the generated print data for each page to an image forming device, an interrupt detection unit to detect an interruption in the transmission of the print data, a menu generating unit to generate a print option setting menu to allow a user to reset a print option for at least one of the print data corresponding to a page of the document if the interrupt is detected, and a controller to control the print data generation unit to convert the print data corresponding to at least one page after occurrence of the interrupt into print data for the corresponding page to which the reset print option is applied.

The foregoing and/or other aspects and utilities of the present general inventive concept may also be achieved by providing a printing control method of a host device, including generating print data for each page of a document to be printed, transmitting the generated print data for each page to an image forming device, detecting an interrupt in the transmission of the print data, stopping the print data transmission and displaying a print option setting menu to allow a user to reset a print option if the interrupt is detected, and converting the print data for at least one page into print data to which the reset print option is applied and transmitting the print data, if a print option is reset.

The foregoing and/or other aspects and utilities of the present general inventive concept may also be achieved by providing a computer readable recording medium comprising computer readable codes to control a host device, including generating print data for each page of a document to be printed, transmitting the generated print data to an image forming device, if an interrupt occurs while transmitting the print data through the transmission unit, stopping the print data transmission and displaying a print option setting menu, and if the print option is reset through the print option setting menu, converting the print data after occurrence of the interrupt into print data to which the reset print option is applied, and transmitting the print data.

The foregoing and/or other aspects and utilities of the present general inventive concept may also be achieved by providing a computer readable recording medium comprising computer readable codes to control a host device, including generating print data for each page of a document to be printed, transmitting the generated print data for each page to an image forming device, detecting an interrupt in the transmission of the print data, stopping the print data transmission and displaying a print option setting menu to allow a user to reset a print option if the interrupt is detected, and converting the print data for at least one page into print data to which the reset print option is applied and transmitting the print data, if a print option is reset.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which:

FIGS. 3 to 5 are views illustrating a process of resetting a print option of a host device according to an embodiment of the present general inventive concept;

DETAILED DESCRIPTION OF THE PREFERRED EMBODIMENTS

Figure 1:
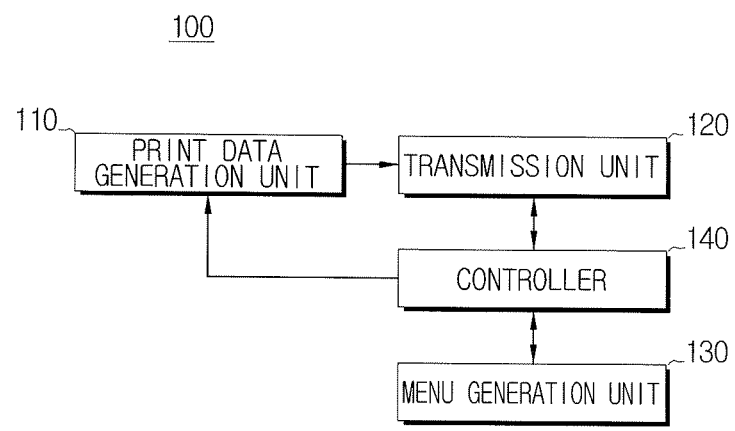
FIG. 1 is a block diagram illustrating a configuration of a host device according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram illustrating a configuration of a host device according to an embodiment of the present general inventive concept. Referring to FIG. 1, a host device 100 may include a print data generation unit 110, a transmission unit 120, a menu generation unit 130, and a controller 140.

The print data generation unit 110 generates print data for each page of a document to be printed. In this instance, the print data generation unit 110 reads functions indicative of the page start and page end of the document to be printed to generate print data for each page of the document to be printed.

The print data generation unit 110 may be a spooler operated by a driver. The spooler converts the document to be printed into print data which is interpretable by an image forming device. This process is called as a spool. That is, in the present general inventive concept, the print data generation unit 110 can read the functions indicative of the start and end of each page to generate a printing job for each page.

The transmission unit 120 can transmit the print data generated by the print data generation unit 110 to the image forming device.

The menu generation unit 130 can generate a print option setting menu under the control of the controller 140, if an interrupt occurs while transmitting the print data through the transmission unit 120. The print option setting menu can be a user interface to set print options, such as printer selection, paper size, the number of sheets to be printed, toner saving mode, background setting, printing cancel, print data generation speed, transmission speed, and the like.

The controller 140 can display the print option setting menu on a screen when the interrupt occurs, so as to reset the print option. More specifically, the image forming device executes the printing operation for the transmitted print data, the host device 100 resets the print option through the displayed print option setting menu. The interrupt may be a printing stop command to be input by the user.

If the print option is reset through the print option setting menu, the controller 140 controls the print data generation unit 110 so as to convert the print data into the print data to which the reset print option is applied.

In this instance, the controller 140 controls the data generation unit 110 by adjusting the print data generation speed randomly to convert the print data according to the adjusted generation speed. The print data generation speed may be determined to be higher than a default value previously set in the driver, according to the specification of the host device 100.

The controller 140 adjusts the transmission speed of the transmission unit 120 according to a size of the print data generated by the data generation unit 110. That is, the controller 140 controls the transmission unit 120 to increase the transmission speed when a size of the print data is high.

If the print data is transmitting to the image forming device from the transmission unit 120 at the interrupt, after the transmission of the print data that is transmitting at present is completed, the print option that is reset from the next print data may be applied. Consequently, the print option may be changed during the printing operation, in accordance with a request of the user.

Figure 2:
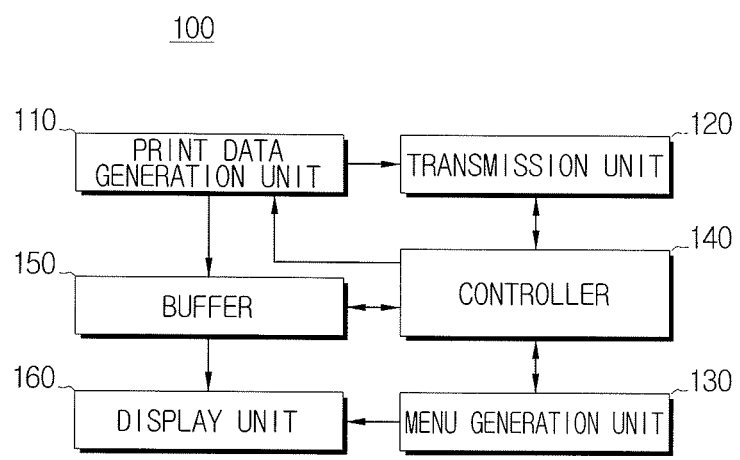
FIG. 2 is a block diagram illustrating a configuration of a host device according to another embodiment of the present general inventive concept.

FIG. 2 is a block diagram illustrating the configuration of a host device according to another embodiment of the present general inventive concept. Referring to FIG. 2, a host device 100 may include a buffer 150 and a display unit 160, in addition to the components illustrated in FIG. 1.

The buffer 150 can temporarily store the print data to which the print option set through the print option setting menu is applied.

If a command to display a waiting list is input, the display unit 160 displays the waiting list of the print data temporarily stored in the buffer. The displayed waiting list will be described with reference to FIG. 3.

FIG. 3 is a view illustrating a printing waiting list according to an embodiment of the present general inventive concept.

Referring to FIG. 3, a waiting list 300 may include a file name of the document to be printed, a page number, a printing state, a size, a port name, and so forth. It can be understood that the print data is generated for each page of the document to be printed through the page number. The number of the print data to be displayed in the waiting list is determined depending upon the size of the buffer 150.

If the interrupt occurs during the printing operation of the document to be printed and at least one print data is selected from the waiting list, the controller 140 can control the menu generation unit 130 to generate a print option setting menu to reset the print option for the selected print data.

If the print option is reset through the print option setting menu, the controller 140 controls the print data generation unit 110 to convert the print data selected from the waiting list into the print data to which the reset print option is applied. The operation of the controller 140 will now be described with reference to FIGS. 4 and 5.

Figure 4:

FIG. 4 is a view illustrating a process of resetting the print option of the host device according to an embodiment of the present general inventive concept. Referring to FIG. 4, it would be understood that the print data for a page 5 is selected from the waiting list 300, and the print option setting menu 400 can be displayed in a popup window type. In this instance, the print option reset through the print option reset menu 400 can be applied to the page 5 only. Meanwhile, plural print data (page numbers) can be selected in the waiting list.

The print option setting menu 400 includes a setup region to set various print options and a speed setting button 410 to set a speed. The user can select the creation speed and transmission speed of the print data through the speed setting button 410.

Figure 5:
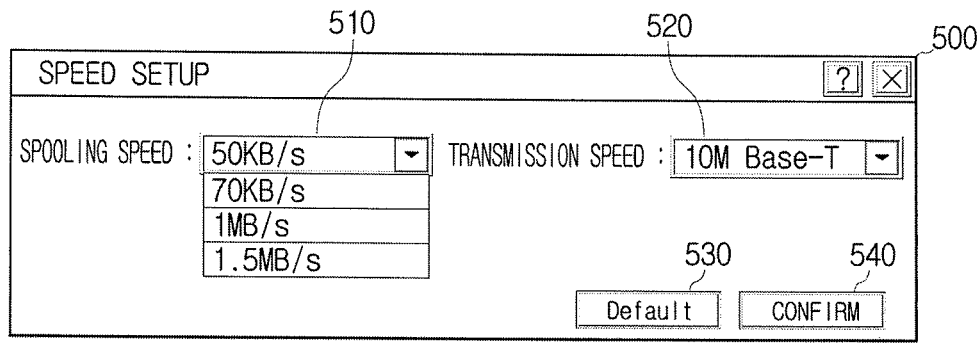

FIG. 5 is a view illustrating a submenu to select the speed setup of FIG. 4. Referring to FIG. 5, a submenu 500 may include a first selection region 510 to select the creation speed of the print data, a second selection region 520 to select the transmission speed, a default value applying button 530, and a confirmation button 540.

Plural print data generation speeds are previously set in the driver so as to select the desired print data generation speed. Referring to FIG. 5, the print data generation speed can be a print data generation speed that can be presently provided by the host device 100, among the plurality of print data generation speeds previously set in the driver, and can be determined according to the specification of the host device 100. Also, the transmission speed is a transmission speed according to a network transmission specification, and may be, for example, a 10M base-T and a 100M base-T transmission speed.

In case of setting the default 530, the print data generation speed is randomly selected, and the transmission speed is determined depending upon a size of the print data to be transmitted. That is, in case of a text file having small size, it can be transmitted according to the 10M base-T specification, while in case of an image file having large size, it can be transmitted according to the 100M base-T specification. Consequently, the print option can be reset to carry out the printing operation, while the printing operation time is shortened.

Figure 6:
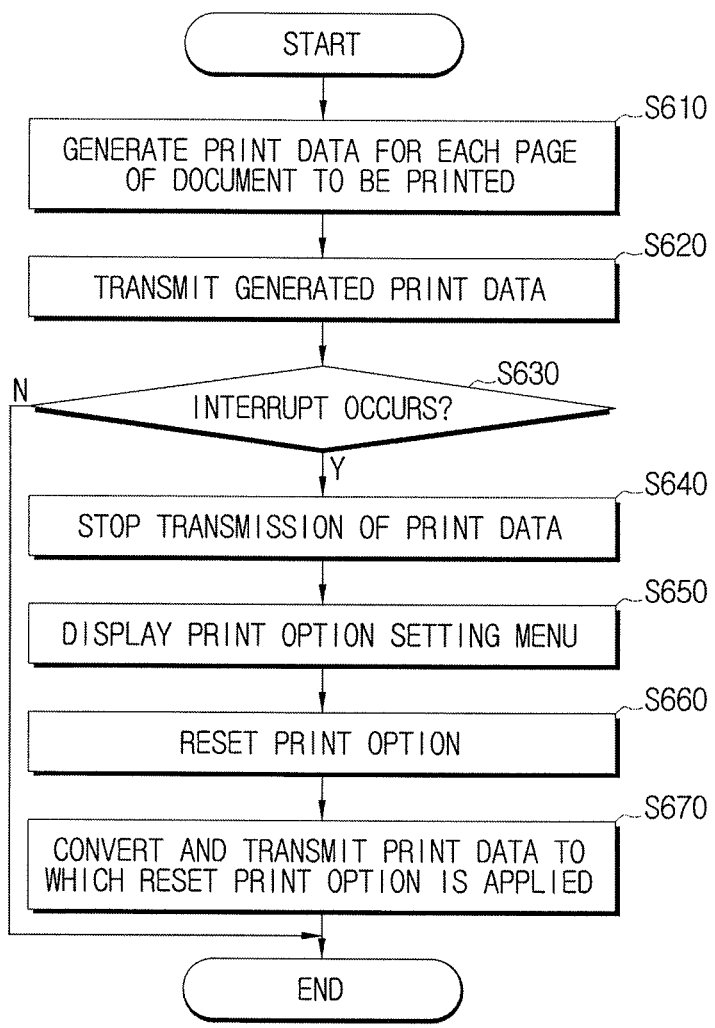
FIG. 6 is a flowchart illustrating a printing control method of a host device according an embodiment of the present general inventive concept.

FIG. 6 is a flowchart illustrating a printing control method of a host device according an embodiment of the present general inventive concept. Referring to FIG. 6, in operation S610, if a printing command is input for a document to be printed, print data is created for each page of the document to be printed. That is, the printing job is created in individual page units.

In operation S620, while the created print data is transmitted, in operation S630 if an interrupt occurs, in operation S640 the transmission of the print data is stopped. In operation S650, the print option setting menu is displayed on the screen. In case that the print data is transmitting when the interrupt occurs, the transmission of the print data can be stopped after the print data is completely transmitted.

The image forming device executes the printing operation for the transmitted print data, and the host device resets the print option through the print option setting menu.

If the print option is reset in operation S660, the print data is converted into the print data to which the reset print option is applied, and then is transmitted in operation S670.

Figure 7:
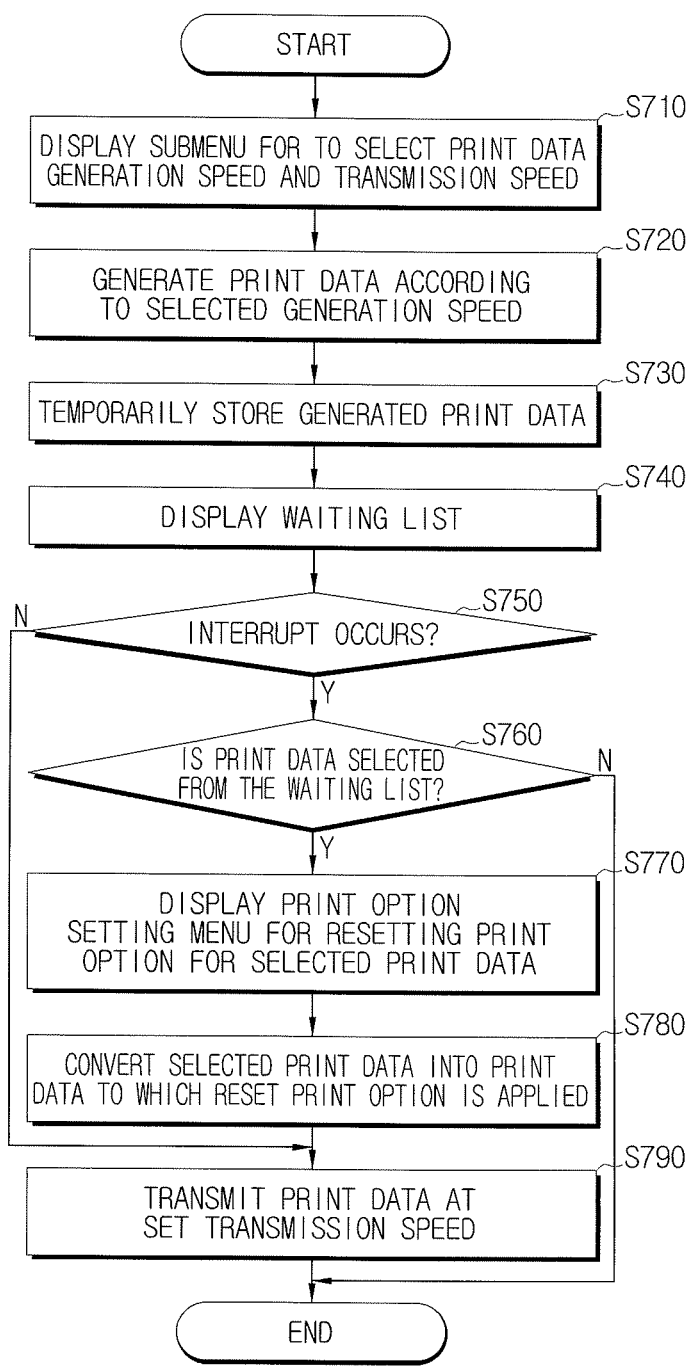
FIG. 7 is a flowchart illustrating the printing control method illustrated in FIG. 6.

FIG. 7 is a flowchart illustrating the printing control method illustrated in FIG. 6. Referring to FIG. 7, if the printing command for the document to be printed is input, the print data is created for each page.

When the printing command is input, the user can set the print option for the document to be printed through the print option setting menu. In this instance, the print option may include printer selection, paper size, the number of sheets to be printed, toner saving mode, background setting, printing cancel, print data generation speed, and transmission speed. Meanwhile, the print data generation speed and the transmission speed can be provided as a submenu of the print option setting menu.

The submenu to select the print data generation speed and the transmission speed is displayed in operation S710, so as to select the print data generation speed and the transmission speed.

The print data generation speed is a transmission speed according to a network transmission specification, and may be, for example, 10M base-T and 100M base-T.

If the print data is generated according to the selected generation speed in operation S720, the generated print data is temporarily stored in operation S730.

If the command to display the waiting list is input, the print data temporarily stored is classified into the page number, and is displayed in the waiting list in operation S740. In this instance, if the interrupt occurs in operation S750 and one print data is selected from the waiting list in operation S760, the print option setting menu to reset the print option for the selected print data is displayed in operation S770.

The print option setting menu may be displayed in the waiting list as a popup window. If the print option is reset through the displayed print option setting menu, the print data selected from the waiting list is converted into the print data to which the reset print option is applied in operation S780.

In this instance, the conversion of the print data may be executed by the reset print option only, and may be converted from a page after the interrupt occurs.

The converted print data is transmitted to the image forming device at the transmission speed selected through the submenu in operation S790.

Various embodiments of the present general inventive concept can be embodied as computer readable codes on a computer-readable medium. The computer-readable medium includes a computer-readable recording medium and a computer-readable transmission medium. The computer readable recording medium may include any data storage device suitable to store data that can be thereafter read by a computer system. Examples of the computer readable recording medium include, but are not limited to, a read-only memory (ROM), a random-access memory (RAM), CD-ROMs, magnetic tapes, floppy disks, optical data storage devices, and carrier waves (such as data transmission through the Internet). The computer readable transmission medium can be distributed over network coupled computer systems, through wireless or wired communications over the internet, so that the computer readable code is stored and executed in a distributed fashion. Various embodiments of the present general inventive concept may also be embodied in hardware or in a combination of hardware and software.

With the above description, according to the present general inventive concept, since the print data is generated for each page, the print option can be reset for each page while carrying out the printing operation. Consequently, the total printing time can be shortened by increasing the print data generation speed and the transmission speed. Therefore, it can promote the convenience of the user.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A host device, comprising:
    a print data generation unit to generate print data for each page of a document to be printed;
    a transmission unit to transmit the generated print data to an image forming device;
    a menu generation unit to generate a print option setting menu to reset a print option if an interruption command initiated by a user occurs while transmitting the generated print data through the transmission unit; and
    a controller to control the print data generation unit to convert the generated print data for at least one page of the document after occurrence of the interruption command into print data for the at least one page of the document to which the reset print option is applied, and to control the transmission unit to transmit the print data to which the reset print option is applied to the image forming device,
    wherein the print data comprises a plurality of data corresponding to respective pages of the document to be printed for different respective print jobs.

2. The host device of claim 1, further comprising:
    a buffer to temporarily store the generated print data to which the print option set through the print option setting menu is applied; and
    a display unit to display a waiting list of the generated print data temporarily stored in the buffer,
    wherein if the interruption command occurs during the printing operation of the document to be printed and the generated print data for at least one page of the document is selected from the waiting list, the controller controls the menu generation unit to generate the print option setting menu to reset the print option for the selected print data.

3. The host device of claim 2, wherein if the print option is reset through the print option setting menu, the controller controls the print data generation unit to convert the generated print data selected from the waiting list into the print data to which the reset print option is applied.

4. The host device of claim 1, wherein the menu generation unit generates a submenu to select a print data generation speed of the print data generation unit and a transmission speed of the transmission unit, and the controller controls the print data generation unit and the transmission unit to generate and transmit the print data according to the print data generation speed and the transmission speed selected through the submenu.

5. A printing control method of a host device, comprising:
    generating print data for each page of a document to be printed;
    transmitting the generated print data to an image forming device;
    if an interruption command initiated by a user occurs while transmitting the generated print data through the transmission unit, stopping the generated print data transmission and displaying a print option setting menu; and
    if the print option is reset through the print option setting menu, converting the generated print data for at least one page of the document after occurrence of the interruption command into print data for the at least one page of the document to which the reset print option is applied, and transmitting the converted print data to the image forming device, wherein the print data comprises a plurality of data corresponding to respective pages of the document to be printed for different respective print jobs.

6. The method of claim 5, further comprising:
temporarily storing the generated print data; and
displaying a waiting list of the generated print data temporarily stored,
wherein the transmitting of the generated print data transmits the generated print data temporarily stored to the image forming device.

7. The method of claim 6, wherein the displaying of the print option setting menu comprises selecting generated print data for at least one page of the document from the waiting list and displaying the print option setting menu to reset the print option for the selected print data if the interruption command occurs during the transmission of the generated print data.

8. The method of claim 7, wherein the converting of the print data comprises:
converting the selected print data into the print data to which the reset print option is applied; and
transmitting the converted print data to the image forming device.

9. The method of claim 5, further comprising:
displaying a submenu to select a print data generation speed and a transmission speed of the document to be printed,
wherein the generating of the print data and the transmitting of the generated print data generate and transmit the print data according to the print data generation speed and the transmission speed selected through the submenu.

10. A host device, comprising:
a print data generation unit to generate first print data with a first print option;
a transmission unit to transmit the first generated print data to an image forming device; and
a controller to automatically control the print data generation unit to generate second print data, which corresponds to a remaining portion of the first print data, with a second print option according to a user interruption command of the transmission of the first generated print data, and to control the transmission unit to transmit the second generated print data to the image forming device,
wherein the first generated print data comprises print data for each page of a document and the second generated print data comprises print data for each page of the document after the user interruption command of the transmission.

11. The host device of claim 10, wherein the controller detects the user interruption command of the transmission of the first generated print data according to a signal from the transmission unit and the image forming device.

12. The host device of claim 10, wherein the first print data and the second print data are the same, and the first print option and the second print option are different.

13. The host device of claim 10, further comprising:
a menu generating unit to display a menu,
wherein the controller controls the menu generating unit to display a print option setting menu as the menu to set the second print option according to the interruption command.

14. The host device of claim 10, wherein the interruption command of the transmission of the first generated print data comprises:
an incomplete transmission of the first generated print data with the first print option from the transmission unit to the image forming device.

15. The host device of claim 10, wherein the interruption command of the transmission of the first generated print data comprises:
an incomplete print operation to print an image according to the first generated print data and the first print option in the image forming device.

16. A control method of a host device usable with an image forming device, the control method comprising:
generating a first print data according to a first print option;
transmitting the first generated print data to an image forming device;
detecting a user interruption command of the transmitting of the first generated print data; and
automatically generating a second print data, which corresponds to a remaining portion of the first print data, with a second print option if the user interruption command is detected, and transmitting the second generated print data to the image forming device,
wherein the first print data comprises print data for each page of a document and the second print data comprises print data for each page of the document after the user interruption command is detected.

17. A host device, comprising:
a print data generation unit to generate print data for each page of a document to be printed;
a transmission unit to transmit the generated print data for each page to an image forming device;
an interruption detection unit to detect an interruption command initiated by a user in the transmission of the generated print data;
a menu generating unit to generate a print option setting menu to allow a user to reset a print option for the generated print data corresponding to at least one page of the document if the interruption command is detected; and
a controller to control the print data generation unit to convert the generated print data corresponding to at least one page of the document after occurrence of the interruption command into print data corresponding to the at least one page of the document to which the reset print option is applied, and to control the transmission unit to transmit the print data to which the reset print option is applied to the image forming device,
wherein the print data comprises a plurality of data corresponding to respective pages of the document to be printed for different respective print jobs.

18. A printing control method of a host device, comprising:
generating print data for each page of a document to be printed;
transmitting the generated print data for each page to an image forming device;
detecting an interruption command initiated by a user in the transmission of the print data;
stopping the print data transmission and displaying a print option setting menu to allow a user to reset a print option if the interruption command is detected; and
converting the generated print data for at least one page of the document into print data for the at least one page of the document to which the reset print option is applied and transmitting the converted print data to the image forming device, if a print option is reset, wherein the print data comprises a plurality of data corresponding to respective pages of the document to be printed for different respective print jobs.

19. A non-transitory computer readable recording medium comprising computer readable codes to control a host device, comprising generating print data for each page of a document to be printed;

transmitting the generated print data to an image forming device;

if an interruption command initiated by a user occurs while transmitting the generated print data through the transmission unit, stopping the print data transmission and displaying a print option setting menu; and if the print option is reset through the print option setting menu, converting the generated print data for at least one page of the document after occurrence of the interruption command into print data for the at least one page of the document to which the reset print option is applied, and transmitting the converted print data to the image forming device, wherein the print data comprises a plurality of data corresponding to respective pages of the document to be printed for different respective print jobs.

20. A non-transitory computer readable recording medium comprising computer readable codes to control a host device, comprising generating print data for each page of a document to be printed;

transmitting the generated print data for each page to an image forming device;

detecting an interruption command initiated by a user in the transmission of the generated print data;

stopping the generated print data transmission and displaying a print option setting menu to allow a user to reset a print option if the interruption command is detected; and converting the generated print data for at least one page of the document into print data for the at least one page of the document to which the reset print option is applied and transmitting the converted print data to the image forming device, if a print option is reset, wherein the interruption command is generated according to a user command.

21. The host device of claim 1, wherein the generated print data includes print data corresponding to each page of the document and the converted generated print data does not include print data corresponding to pages of the document before the occurrence of the interruption command.

* * * * *